United States Patent
Borneman et al.

(10) Patent No.: US 7,792,600 B2
(45) Date of Patent: Sep. 7, 2010

(54) SYSTEM AND A METHOD FOR ASSEMBLING A ROTOR STACK

(75) Inventors: Karl Lee Borneman, Dayton, OH (US); Craig Ronald Ziegler, Evendale, OH (US); Jeffrey John Eschenbach, Loveland, OH (US); Gregory Patrick Foley, Centerville, OH (US)

(73) Assignee: General Electric Company, Schenectady, NY (US)

( * ) Notice: Subject to any disclaimer, the term of this patent is extended or adjusted under 35 U.S.C. 154(b) by 81 days.

(21) Appl. No.: 11/968,098

(22) Filed: Dec. 31, 2007

(65) Prior Publication Data

US 2009/0171491 A1 Jul. 2, 2009

(51) Int. Cl.
- G06F 19/00 (2006.01)
- G06F 17/50 (2006.01)
- G06F 17/00 (2006.01)
- G06K 9/00 (2006.01)
- G06T 1/00 (2006.01)
- G01D 1/00 (2006.01)

(52) U.S. Cl. .............. 700/98; 700/95; 700/97; 700/118; 700/163; 700/279; 702/127; 703/1; 345/418; 345/420; 382/154

(58) Field of Classification Search .......... 700/95–98, 700/118, 163, 279; 703/1; 345/418, 420; 382/154; 702/127
See application file for complete search history.

(56) References Cited

U.S. PATENT DOCUMENTS

| | | | |
|---|---|---|---|
| 5,459,674 A * | 10/1995 | Ide et al. | 703/1 |
| 6,148,494 A * | 11/2000 | Bauer et al. | 29/407.05 |
| 6,230,501 B1 * | 5/2001 | Bailey et al. | 62/51.1 |
| 6,299,410 B1 * | 10/2001 | Hilbert et al. | 416/145 |
| 6,341,419 B1 | 1/2002 | Forrester et al. | |
| 6,625,507 B1 * | 9/2003 | Dickerson et al. | 700/97 |
| 6,898,547 B1 | 5/2005 | DeBlois et al. | |
| 2003/0074244 A1* | 4/2003 | Braxton | 705/7 |
| 2004/0263099 A1* | 12/2004 | Maslov et al. | 318/254 |
| 2005/0234576 A1* | 10/2005 | Lee | 700/97 |
| 2006/0020629 A1* | 1/2006 | Ramani et al. | 707/104.1 |
| 2006/0089737 A1 | 4/2006 | Forrester et al. | |
| 2006/0153684 A1* | 7/2006 | Henning et al. | 416/223 R |
| 2007/0272013 A1* | 11/2007 | Vian et al. | 73/460 |
| 2008/0041065 A1* | 2/2008 | Muller et al. | 60/804 |
| 2008/0230272 A1* | 9/2008 | Chen et al. | 175/45 |

OTHER PUBLICATIONS

Technical Literature for SPS 1000 Series Rotor Stacking Equipment (2 pages).

* cited by examiner

*Primary Examiner*—Ramesh B Patel
(74) *Attorney, Agent, or Firm*—William Scott Andes

(57) ABSTRACT

A system for assembling a rotor stack having a plurality of rotor disks may include a measurement system for measuring characteristics of the rotor disks, a computer electronically connected to the measurement system for capturing data from the measurement system, and solid modeling software for creating a virtual stack of the rotor disks optimized for concentricity.

20 Claims, 3 Drawing Sheets

SYSTEM AND A METHOD FOR ASSEMBLING A ROTOR STACK

BACKGROUND OF THE INVENTION

The exemplary embodiments relate generally to rotor assemblies for gas turbine engines and more particularly to methods and systems for assembling rotor assemblies.

A gas turbine engine is an example of a large rotary machine requiring dimensional precision for reducing vibration at high rotational speed. Vibration may occur due to mass unbalance around an axial centerline axis of the engine, and/or due to eccentricity of the rotor therearound. Runout, roundness, concentricity and flatness are of particular concern in an assembly of rotor components since they may contribute to eccentricity. The individual rotors in a typical gas turbine engine vary in configuration for aerodynamic, mechanical, and aeromechanical reasons, which increases the complexity of the engine design and the difficulty in reducing undesirable eccentricity.

For example, a multistage compressor or turbine includes rows of airfoils extending radially outwardly from supporting rotor disks. The airfoils may be removably mounted in corresponding dovetail slots formed in the perimeter of the disks, or may be integrally formed therewith in a unitary construction known as a blisk. Individual disks may be bolted together at corresponding annular flanges having a row of axial bolt holes through which fastening bolts extend for joining together the several rotors in axial end-to-end alignment. Some rotor disks are typically formed in groups in a common or unitary rotor drum, with the drum having end flanges bolted to adjoining rotors having similar annular flanges. Accordingly, the multistage assembled rotor includes several rotor disks axially joined together at corresponding annular flanges. Each rotor is separately manufactured and is subject to eccentricity between its forward and aft mounting flanges, and is also subject to non-perpendicularity or tilt of its flanges relative to the axial centerline axis of the engine.

Both eccentricity and tilt of the rotor end flanges are random and typically limited to relatively small values. However, the assembly of the individual rotors with their corresponding flange eccentricities and tilts are subject to stack-up and the possibility of significantly larger maximum eccentricity due to the contribution of the individual eccentricities. Accordingly, when the rotor assembly is mounted in bearings in the supporting engine stator, the corresponding rotor seats or journals mounted in the bearings may have relative eccentricity therebetween, and intermediate flange joints between individual rotors of the assembly may have an eccentricity from the engine centerline axis which exceeds the specified limit on eccentricity for the rotors due to stack-up. In this case, the rotor assembly must be torn down and reassembled in an attempt to reduce stack-up eccentricities to an acceptable level within specification.

One manner of reducing the random nature of the assembly stack-up is to measure each rotor during the assembly sequence to determine the runout, roundness, concentricity and flatness of mating diameters and flanges and then assembling that component to a preceding component for reducing the collective stack-up of eccentricity upon final rotor assembly. Individual rotors are mounted on a turntable using a suitable fixture so that the rotor may be rotated about its axial centerline axis. Linear measurement gauges are mounted to the table and engage the corresponding mounting flanges of the rotor for measuring any variation of radius of the flanges from the axial centerline axis around the circumference of the flanges, and for measuring any variation in axial position of each of the flanges around the circumference.

The gauges are operatively joined to a computer, which receives the measurement data from the gauges mounted at each end flange during measurement. The computer is programmed to calculate various geometric parameters for the end flanges. In particular, the radial measurement data may be used to determine high and low points on the flanges. The computer may then determine a mating rotor surface based on the high and low points of the measured rotors. The computer may also utilize a least squares center algorithm to determine a best-fit surface. This algorithm provides a single vector representing the slope of a face surface or eccentricity of a flange surface. The computer may then determine a best-fit based on vectors from multiple rotors and assemble them accordingly. These methods may ignore other opportunities for an optimal assembly. For example, accuracy of processing of least squares center and high/low points may be improved to properly account for all shapes/conditions experienced. The least squares center results are a simplified description of the average surface. It presents a best-fit model not taking into account local variations in the topography of the mating surfaces and diameters, which may have a significant impact on the stack. For example, if a rotor with a flange face with two equal and substantial peaks 180 degrees apart was mated to a perfectly flat part, it could be rocked to one side or the other, pivoting about the peaks, depending on which side was attached first. Using the same example with two peaks, if the mating part had a similar feature (two peaks), the computer does not optimize the stack by looking at an interlocking of peaks.

BRIEF DESCRIPTION OF THE INVENTION

In one exemplary embodiment, a system for assembling a rotor stack having a plurality of rotor disks may include a measurement system for measuring characteristics of the rotor disks, a computer electronically connected to the measurement system for capturing data from the measurement system, and solid modeling software for creating a virtual stack of the rotor disks optimized for concentricity.

In another exemplary embodiment, a method for assembling a rotor stack having a plurality of rotor disks may include the steps of measuring one or more characteristics of the rotor disks with a measurement system, obtaining data from the measuring step, converting the data into solid models of the rotor disks, and creating a virtual stack based on the solid models to optimize concentricity.

DETAILED DESCRIPTION OF THE INVENTION

Figure 1:
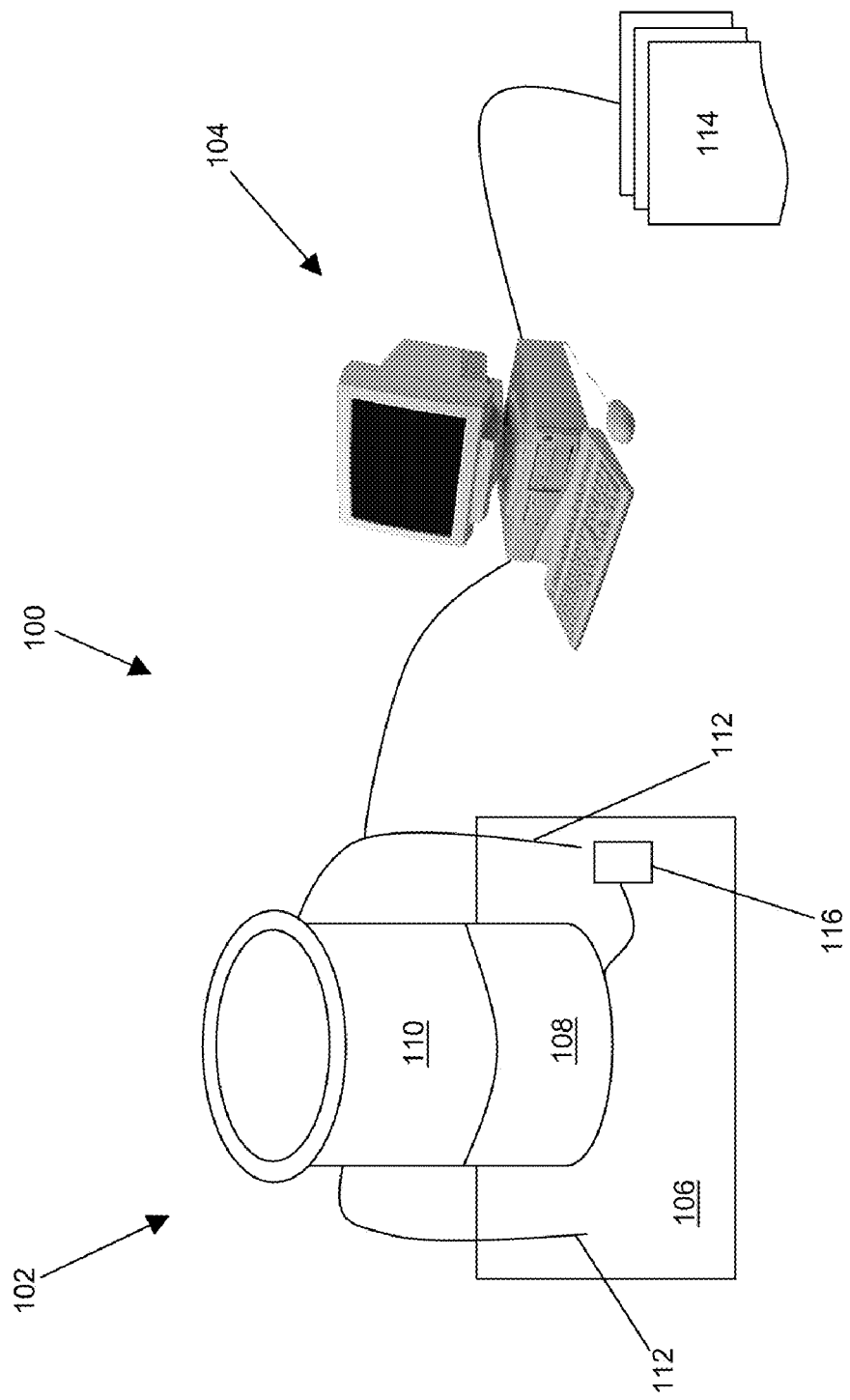
FIG. 1 is a schematic representation of one exemplary embodiment of a system for assembling a rotor stack.

It should be understood that any reference to an electronic connection between components in the following description could be a wired or wireless connection. FIG. 1 illustrates schematically one exemplary embodiment of a system 100 for assembling a rotor stack. The system 100 includes a measurement system 102 and a computer 104 connected to the measurement system 102. The measurement system 102 may be used to measure one or more characteristics of a plurality of rotor disks that may be used to assemble a rotor stack. The one or more characteristics may be any characteristic of a rotor disk that, taken separately or combined as a rotor stack, may contribute to the eccentricity of the rotor stack. For example, the characteristics may include runout, roundness, concentricity, perpendicularity, parallelism and/or flatness. The measurement system may include a platform 106 that supports a turntable 108. The turntable 108 may fix the rotor disk 110 in a rotatable relationship to the platform 106. The measurement system 102 may have one or more measurement probes 112 that may be fixed to the platform 106. The measurement probes 112 may be any probes known in the art for measuring one or more characteristics of the rotor disk 110, including, but not limited to, linear variable displacement transducers (LVDTs), non-contact laser-based probes and ultrasonic probes. The probes 112 may be positioned to measure certain locations on the rotor disk 110, such as, but not limited to, mating diameters and flanges. The diameters and flanges may also include a plurality of holes or other similar features that may be used with other connecting components, such as, bolts or similar components, to assemble one rotor disk to another adjacent rotor disk. The probes 112 may obtain data related to the characteristics of the rotor disk 110 and the locations measured.

The computer 104 may be electronically connected to the probes 112 to capture data obtained by the probes 112. The computer 104 may be any suitable computer system known in the art and may include solid modeling software 114. In one exemplary embodiment, a separate computer may be used to capture the data from the probes 112. Solid modeling software 114 is software capable of representing the solid parts of an object in a three dimensional digital environment. The LVDT probes provide relative displacement. A rotary encoder 116 may be provided and interfaced with the computer 104 to provide simultaneous reference position information for the LVDT data.

Figure 2:
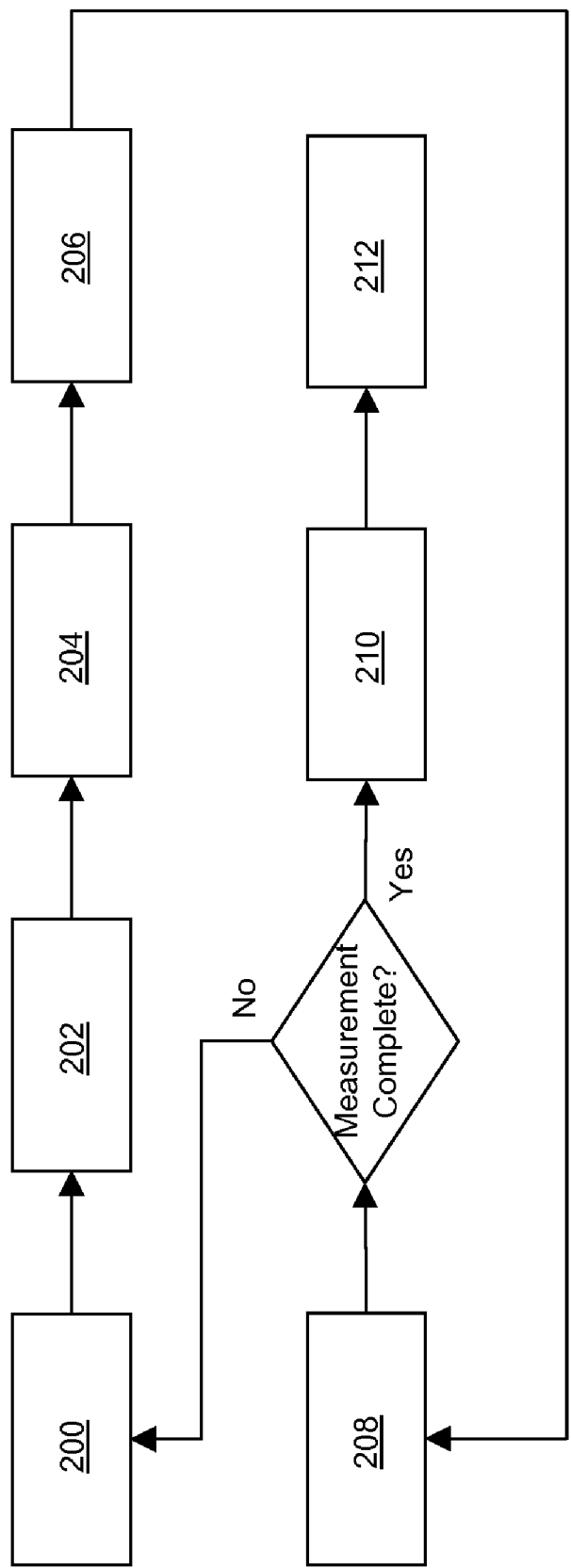
FIG. 2 is a flow chart of one exemplary embodiment of a method for assembly a rotor stack.
Figure 3:
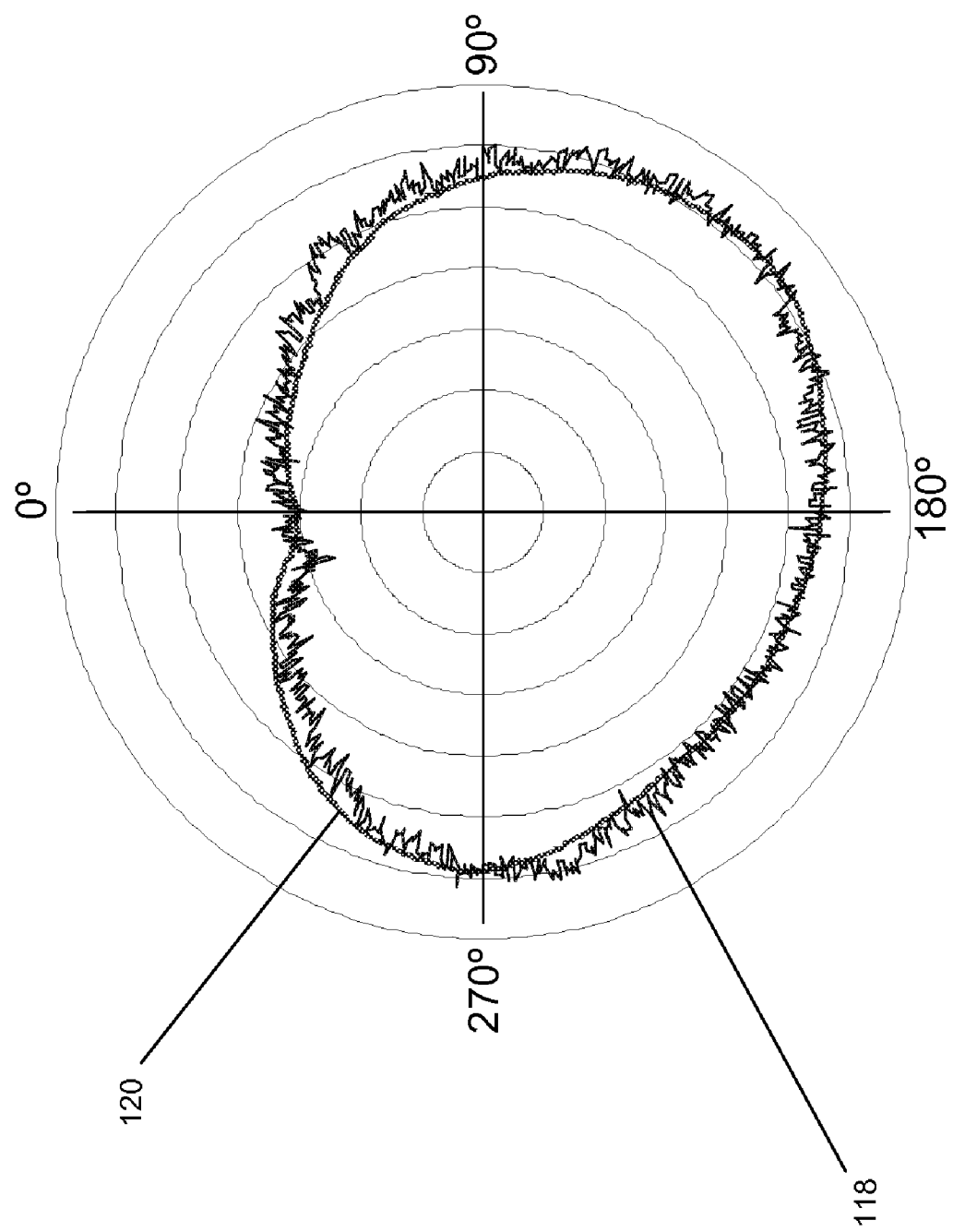
FIG. 3 is a polar plot of an example data set from measuring a component to be assembled in a rotor stack.

The system 100 may be used to measure, stack and assemble a plurality of rotor disks. FIG. 2 illustrates one exemplary embodiment of a method of assembling a rotor stack. A rotor disk 110 is loaded into the measurement system 102 and fixed into place on the turntable 108 at step 200. Measurement probes 112 are positioned adjacent the locations to be measured on the rotor disk 110 at step 202. Next, at step 204, the turntable 108 may be rotated and the probes 112 may capture data about the rotor disk 110. As discussed above, the probes 112 may capture data on any number of different characteristics of the rotor disk, such as, but not limited to, runout, roundness, concentricity, perpendicularity, parallelism and/or flatness. The captured data may be a collection of numbers related to points in space of the rotor disk. FIG. 3 illustrates an example 118 of the data collected by the probes as represented within polar graph form. The relative deflection of the probes is displayed as a function of angular position. Noise, such as, but not limited to, friction of the probe against the rotor disk, vibration and any environmental conditions may be filtered from the data. A major shape 120 may be identified by a best-fit calculation of the data after the noise has been filtered. The data may be transmitted to the solid modeling software 114 at step 206.

The solid modeling software 114 then translates the captured data from the probes 112 into approximations of surfaces on a solid model of the rotor disk at step 208. The computer 104 may be used to capture the data from the probes 112 as well as run the solid modeling software 114 or two separate computers may be used. The major shape 120 may be expanded to form a band that is an approximation of the surface of the part measured. This gives the solid modeling software a 3D approximation of the surface of the measured part to compare to other measured parts. Steps 200 through 208 may be repeated for each rotor disk 110 to be measured and assembled.

Once all of the rotor disks 110 are measured and modeled, the software 114 may build a virtual stack optimized for straightness and concentricity at step 210 taking into account all characteristics such as peaks and valleys inherent to the parts surface or diameter that combine to affect the outcome of the stack. This may be accomplished by iteratively checking each of the mating combinations. There may be as many mating combinations as there are holes or similar connection features in the mating components. For example, the software may begin with a predetermined mating combination, rotate the component one mating combination to the right or left and compare the mating combinations. The software may identify the better combination and then move to the next adjacent combination. This may be repeated for each mating combination. Once complete, the software will have identified the optimum mating combination. Alternatively, to minimize the computational power needed, the virtual stack may step through a series of educated combinations. For example, the software may identify the maximum and minimum surfaces of the mating components and compare those mating combinations with the adjacent mating combination. The software may identify the better combination and then move to the next adjacent combination on the opposite side of the original combination. This may be repeated as many times as practical until the optimum virtual stack is identified. The process may be repeated for each other component in the virtual stack until the optimum virtual stack is identified. This may take into account not only general measurements such as concentricity or perpendicularity, but the specific undulations seen on the diameter and faces of the mating parts. Finally, the rotor disks 110 may be assembled according to the optimized virtual stack, at step 212. The exemplary embodiments described allow a rotor stack to be formed in an optimum way by taking into account the specific geometry of each mating surface. By doing so, the amount of concentricity and perpendicularity can by minimized.

This written description discloses exemplary embodiments, including the best mode, to enable any person skilled in the art to make and use the exemplary embodiments. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for assembling a rotor stack having a plurality of rotor disks, comprising:
    a measurement system for measuring characteristics of said plurality of rotor disks;
    a computer electronically connected to said measurement system for capturing data from said measurement system; and
    solid modeling software associated with said computer and said data for creating a virtual stack of said plurality of rotor disks optimized for concentricity.

2. The system for assembling a rotor stack of claim 1 wherein said measurement system includes a platform associated with said measurement system for receiving said rotor disks.

3. The system for assembling a rotor stack of claim 2 wherein said measurement system includes a turntable associated with said platform for rotating said rotor disks.

4. The system for assembling a rotor stack of claim 3 wherein said measurement system includes a plurality of probes.

5. The system for assembling a rotor stack of claim 4 wherein said measurement system includes a rotary encoder for determining the position of said rotor disks.

6. The system for assembling a rotor stack of claim 1 wherein said measurement system includes a plurality of probes.

7. The system for assembling a rotor stack of claim 1 wherein said measurement system includes a rotary encoder for determining the position of said rotor disks.

8. A method for assembling a rotor stack having a plurality of rotor disks, comprising:

measuring one or more characteristics of said plurality of rotor disks with a measurement system;

obtaining data from said measuring step;

converting said data into solid models of said plurality of rotor disks; and creating a virtual stack based on said solid models to optimize concentricity.

9. The method for assembling a rotor stack of claim 8 wherein said measuring step includes loading a rotor disk into said measurement system and positioning measurement probes adjacent a plurality of locations to be measured on said rotor disk.

10. The method for assembling a rotor stack of claim 9 wherein said obtaining step includes rotating said rotor disk and capturing data about said rotor disk with said probes.

11. The method for assembling a rotor stack of claim 10 wherein said probes capture data on at least one characteristic of said rotor disk selected from the group consisting of, runout, roundness, concentricity, perpendicularity, parallelism and flatness.

12. The method for assembling a rotor stack of claim 11 wherein said obtaining step includes filtering noise from said data.

13. The method for assembling a rotor stack of claim 8 wherein said converting step includes translating said data into approximations of surfaces on a solid model of said rotor disk.

14. The method for assembling a rotor stack of claim 13 wherein said translating step includes expanding said data to form a band that is an approximation of a surface of said rotor disk.

15. The method for assembling a rotor stack of claim 8 wherein said creating step includes taking into account all characteristics of said rotor disks that combine to affect the outcome of the stack.

16. The method for assembling a rotor stack of claim 8 wherein said creating step includes iteratively checking each of a plurality of mating combinations of said solid models.

17. The method for assembling a rotor stack of claim 8 wherein said obtaining step includes rotating said rotor disk and capturing data about said rotor disk with a plurality of probes.

18. The method for assembling a rotor stack of claim 8 wherein said obtaining step includes filtering noise from said data.

19. The method for assembling a rotor stack of claim 8 wherein said creating step includes expanding said data to form a band that is an approximation of a surface of said rotor disk.

20. The method for assembling a rotor stack of claim 8 further comprising:

assembling said rotor disks according to said virtual stack.

* * * * *